United States Patent
Ito et al.

[11] Patent Number: 6,134,490
[45] Date of Patent: Oct. 17, 2000

[54] POWER STEERING DEVICE ASSISTED BY VARIABLE POWER

[75] Inventors: Norihisa Ito, Anjo; Nobuhiko Uryu; Yasuhiko Sugihara, both of Kariya, all of Japan

[73] Assignee: DENSO Corporation, Kariya, Japan

[21] Appl. No.: 09/277,739

[22] Filed: Mar. 29, 1999

[30] Foreign Application Priority Data

| May 19, 1998 | [JP] | Japan | 10-137155 |
| Sep. 3, 1998 | [JP] | Japan | 10-249911 |
| Dec. 21, 1998 | [JP] | Japan | 10-363346 |

[51] Int. Cl.$^7$ ...................................................... B62D 5/04
[52] U.S. Cl. ............................................. 701/42; 180/443
[58] Field of Search ........................ 701/41, 42; 180/443, 180/446

[56] References Cited

U.S. PATENT DOCUMENTS

| 5,040,629 | 8/1991 | Matsuoka et al. | 180/446 |
| 5,631,529 | 5/1997 | Shimizu et al. | 318/432 |
| 5,698,956 | 12/1997 | Nishino et al. | 318/432 |
| 5,699,249 | 12/1997 | Noro et al. | 701/42 |

FOREIGN PATENT DOCUMENTS 3-11943   2/1991   Japan .

*Primary Examiner*—Michael J. Zanelli
*Attorney, Agent, or Firm*—Pillsbury Madison & Sutro LLP

[57] ABSTRACT

Steering of a vehicle is assisted by a motor driven according to a steering signal formulated by a digital computer. The steering signal is formulated so that a high and quick power-assist is obtained when the steering is steep or sharp, while trembling vibrations appearing on a steering wheel due to noise are suppressed when the steering is slow or the steering wheel is stably held. A steering velocity calculated from a steering angle and a steering torque signal detected from a torsional torque of a steering shaft are used to formulate the steering signal. An original steering torque signal is modified by a transfer function having a higher gain and a higher phase advance in a certain frequency range thereof, thereby formulating a final steering signal which controls operation of the power-assist motor.

10 Claims, 8 Drawing Sheets

POWER STEERING DEVICE ASSISTED BY VARIABLE POWER

CROSS-REFERENCE TO RELATED APPLICATIONS

This application is based upon and claims benefit of priority of Japanese Patent Applications No. Hei-10-137155 filed on May 19, 1998, No. Hei-10-249911 filed on Sep. 3, 1998, and No. Hei-10-363346 filed on Dec. 21, 1998, the contents of which are incorporated herein by reference.

BACKGROUND OF THE INVENTION

1. Field of the Invention

The present invention relates to a power steering device for an automobile, in which the steering is assisted by a power source such as an electric motor.

2. Description of Related Art

As an example of a power steering device of this kind, JP-B2-3-11943 discloses a control system for a power steering device assisted by an electric motor. This control system includes a phase compensator that generates signals proportional to differentiated values of outputs from a torque sensor detecting a steering shaft torque. The phase compensator compensates a delay of a transfer characteristic in a control system caused by frictions and other factors in the steering system. In other words, the phase compensator stabilizes operation of the control system and cancels a delay of a power-assist electric motor due to its inertia by changing a phase of the torque signal. The phase compensator is composed of analog or digital circuits, and its frequency-responsive characteristic functions to increase the gain and advance the phase of the torque signals.

In the control system disclosed in the above publication, however, the torque signals compensated by the phase compensator tend to include noise because the differentiated values of the torque signals are used. The noise is amplified in a frequency region where the gain of the phase compensator is increased, and the amplified noise is included in current for driving the power-assist motor. Therefore, the noise is included in an output of the power-assist motor. As a result, the motor output that includes the amplified noise generates a trembling vibration on a steering wheel, which is felt by a driver especially when a steering wheel is stably held or slowly rotated. If the gain of the phase compensator is lowered to avoid the uncomfortable vibrations, a quick response of the steering system is sacrificed because the phase advance is also lowered. As a result, the power-assist motor does not respond quickly enough to sufficiently assist a steep steering, and the steering wheel becomes heavy, giving uncomfortable steer-feeling to a driver.

SUMMARY OF THE INVENTION

The present invention has been made in view of the above-mentioned problems, and an object of the present invention is to provide a power steering device which gives a quick assisting power at steep steering and does not generate uncomfortable trembling vibrations on the steering wheel when the steering wheel is stably held or slowly rotated. Another object of the present invention is to provide a method of controlling a power steering device, in which a quick power-assist is obtained at a steep steering and no trembling vibration is generated at a slow steering or no steering.

The power steering device in which steering of a vehicle is assisted by a certain power source such as an electric motor is composed of a steering angle sensor, a steering velocity detector, a steering torque sensor, a steering signal generator for formulating a steering signal based on the steering velocity and the steering torque, a motor driver for supplying current corresponding to the steering signal, and a power-assist motor. The steering velocity is calculated from the steering angle, and steering torque is detected by measuring a torsional torque of a steering shaft.

The steering signal generator is composed of a compensator for modifying a steering signal which is originally proportional to the steering torque, a weighting factor generator for generating a weighting factor according to the steering velocity, and a weighted signal generator for formulating a final steering signal. The original steering signal is modified by the compensator so that it has a higher gain and a higher phase advance in a steep or sharp steering than in a slow or fixed steering, thereby formulating a second steering signal. The original and the second steering signal are combined with the weighting factor generated, thereby formulating the final steering signal, based on which the driving current is supplied to the power-assist motor.

Since the power-assist motor is driven based on the properly formulated steering signal, the steering is sufficiently and quickly assisted by the power-assist motor in a steep steering, while trembling vibrations are suppressed in a slow steering. Though some trembling vibrations appear when the steering is highly assisted in the steep steering, such vibrations are hardly felt by a driver under such a steering condition. Therefore, it is important to suppress the vibrations in the slow steering or no steering, because such vibrations are easily felt by a driver under such a steering condition. The degree of the power-assist gradually varies from a high assist in the steep steering to a moderate assist in the slow steering. Accordingly, a good steer-feeling is obtained throughout a whole range of the steering velocity.

As the power-assist motor, various kinds of power source may be used, including an electric motor, a hydraulic motor and other electric actuators. Since the steering signal generator is built in a digital microcomputer, all the calculations and formulation of signals are quick and precise, and in addition the device can be made compact and inexpensive. It is possible to add an additional circuit in the microcomputer to switch a high and quick power-assist to a low and slow power-assist according to a vehicle speed or the steering torque signal.

Other objects and features of the present invention will become more readily apparent from a better understanding of the preferred embodiments described below with reference to the following drawings.

DETAILED DESCRIPTION OF THE PREFERRED EMBODIMENTS

First Embodiment

Figure 1:
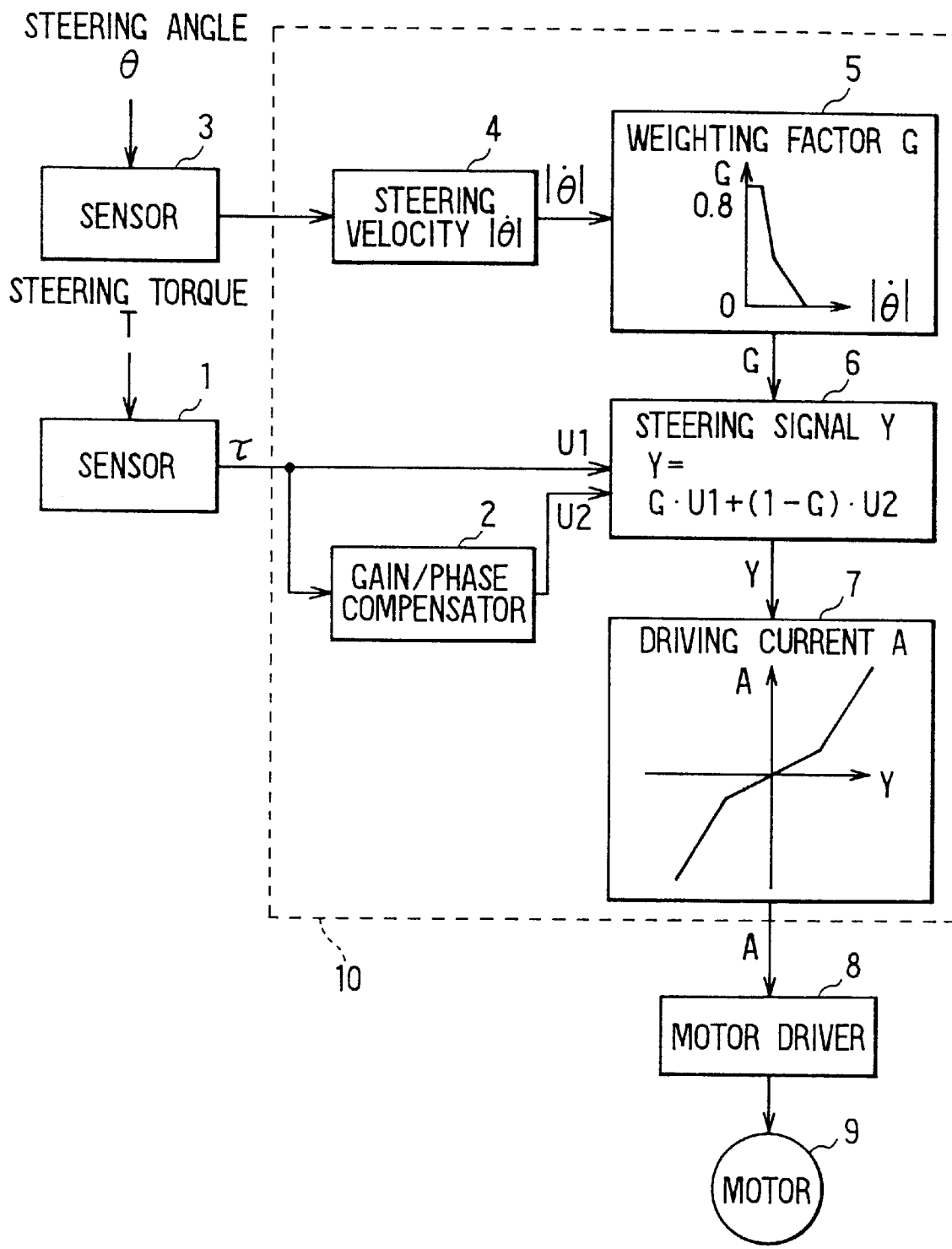
FIG. 1 is a block diagram showing a structure of a power steering device as a first embodiment of the present invention.

A first embodiment of the present invention will be described with reference to FIGS. 1–4B. As shown in FIG. 1, a power steering device is composed of: a steering angle sensor 3; a steering velocity detector 4; a torque sensor 1 for detecting torsional torque of a steering shaft; a steering signal generator consisting of a gain/phase compensator 2, a weighting factor generator 5 and a weighted signal generator 6; a driving current generator 7; a motor driver 8; and a power-assist motor 9.

Figure 2A:
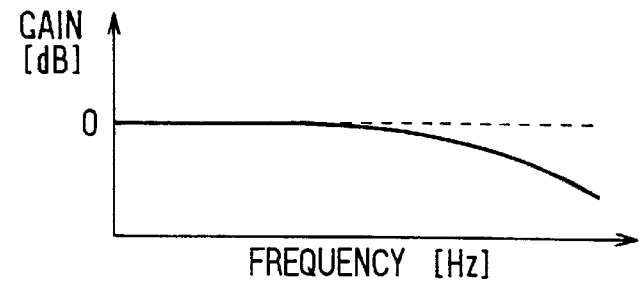
FIGS. 2A and 2B are Bode diagrams showing frequency-response characteristics of a torque sensor used in the first embodiment.
Figure 2B:
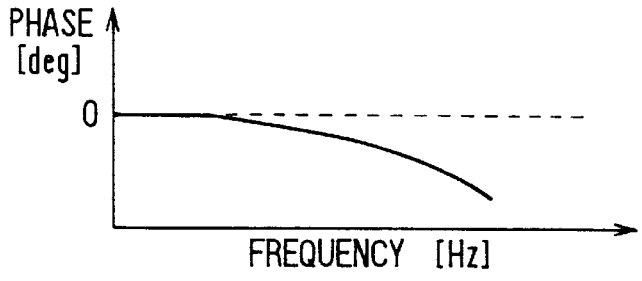

The steering angle sensor 3 for detecting a steering angle θ is attached to the power-assist motor 9 which is connected to the steering shaft via a speed reduction device and generates pulses in response to rotation of the power-assist motor 9. Therefore, the sen sing resolution of the steering angle sensor 3 is sufficiently high. The steering velocity detector 4 is a digital circuit and calculates |dθ/dt| by counting the number of pulses fed from the steering angle sensor 3 in a predetermined period of time. The torque sensor 1 is a contactless magnetic sensor for detecting a torsional torque T of the steering shaft and generates a torque signal τ. A transfer characteristic τ(s)/T(s) of the torque sensor is a substantially linear delay characteristic as shown in FIGS. 2A and 2B.

The steering signal generator is a digital operating circuit including the gain/phase compensator 2, the weighting factor generator 5 and the weighted signal generator 6. The steering signal generator generates the steering signal Y under a transfer characteristic with a low gain and low or no phase advance when the steering velocity |dθ/dt| is low. According t o increase of the steering velocity |dθ/dt|, the steering signal generator generates the steering signal Y under a transfer characteristic with a gradually increasing gain and phase advance. Operation of the steering signal generator will be described later in detail. The driving current signal generator 7 receives the steering signal Y from the steering signal generator and outputs a signal indicating a driving current A which is determined based on the steering signal Y. The driving current signal is fed to a motor driver 8 composed of a power MOS and other components and is converted into an analog signal by a D/A converter (not shown). The power-assist motor 9, which is a direct current motor linked to the steering shaft for assisting steering, is driven by the driving current supplied from the motor driver 8.

Figure 3A:
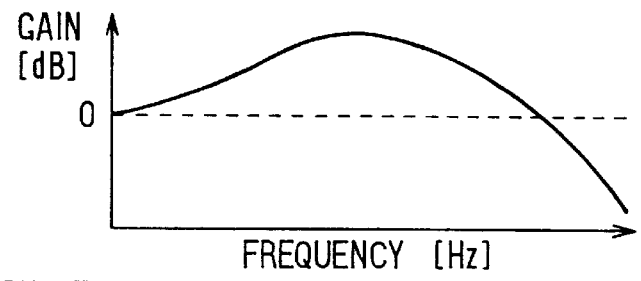
FIGS. 3A and 3B are Bode diagrams showing frequency-response characteristics of a gain/phase compensator used in the first embodiment.
Figure 3B:
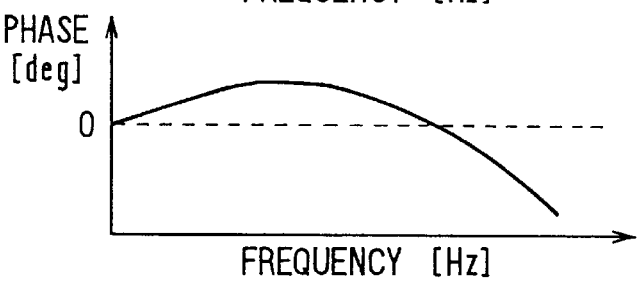

Now, the structure and function of the steering signal generator will be described in detail. The steering torque T is transferred as a torque signal τ under the transfer characteristic of the torque sensor 1 and fed into the weighted signal generator 6 as a signal U1 (U1=τ). At the same time, the torque signal τ is modified by the gain/phase compensator 2 and fed into the weighted signal generator 6 as a signal U2 in parallel with the signal U1. The signals U1 and U2 are combined under a weighting factor G fed from the weighting factor generator 5 in the weighted signal generator 6. A transfer characteristic of the gain/phase compensator 2 is quadratic one including a differential element with a zero pole properly set, and is expressed as: $U2(s)/\tau(s) = g(s-z_{=1})/\{(s-p_1)\cdot(s+p_2)\}$. Under this transfer characteristic, the torque signal τ is compensated so that its gain is increased and its phase is advanced when its frequency shifts from low to high, primarily due to the differential element of the transfer characteristic. Therefore, the gain and phase of the torque T(s) is compensated as shown in FIGS. 3A and 3B.

The weighting factor generator 5 is composed of a memory and digital circuit and receives the steering velocity |dθ/dt| from the steering velocity detector 4. The weighting factor generator 5 calculates the weighting factor G corresponding to the steering velocity |dθ/dt| based on a map stored in the memory. As shown in FIG. 1, the map is formulated so that the weighting factor G is set at 0.8 when the steering velocity |dθ/dt| is in a low range covering fixed steering (the steering wheel is stably held) and slow steering, and it is set at 0 (zero) when the steering velocity |dθ/dt| is in a high range corresponding to steep steering. In an intermediate range between the low and high ranges, the weighting factor G is set so that it gradually decreases from 0.8 to 0. The map determining the weighting factor G has to be formulated according to a type of vehicle based on actual experiments. The transfer characteristic of the gain/phase compensator 2 is also determined based on actual experiments conducted for each type of vehicle.

Figure 4A:
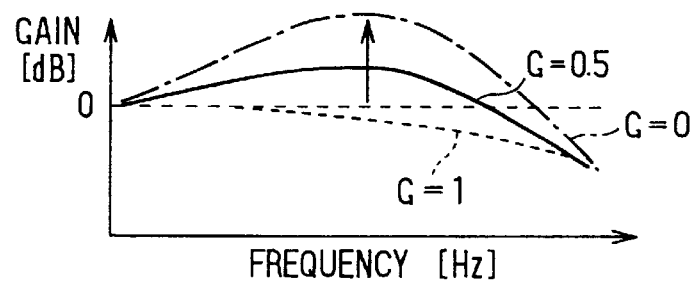
FIGS. 4A and 4B are Bode diagrams showing frequency-response characteristics of a steering signal generator used in the first embodiment.
Figure 4B:
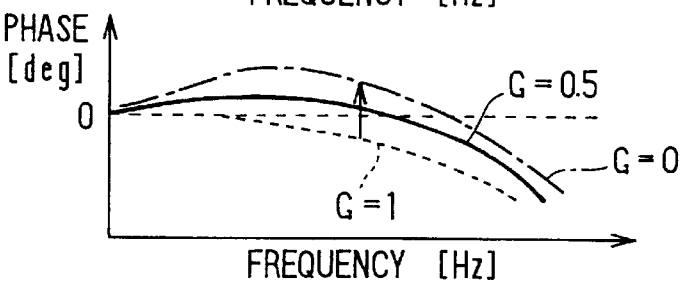
Figure 5:
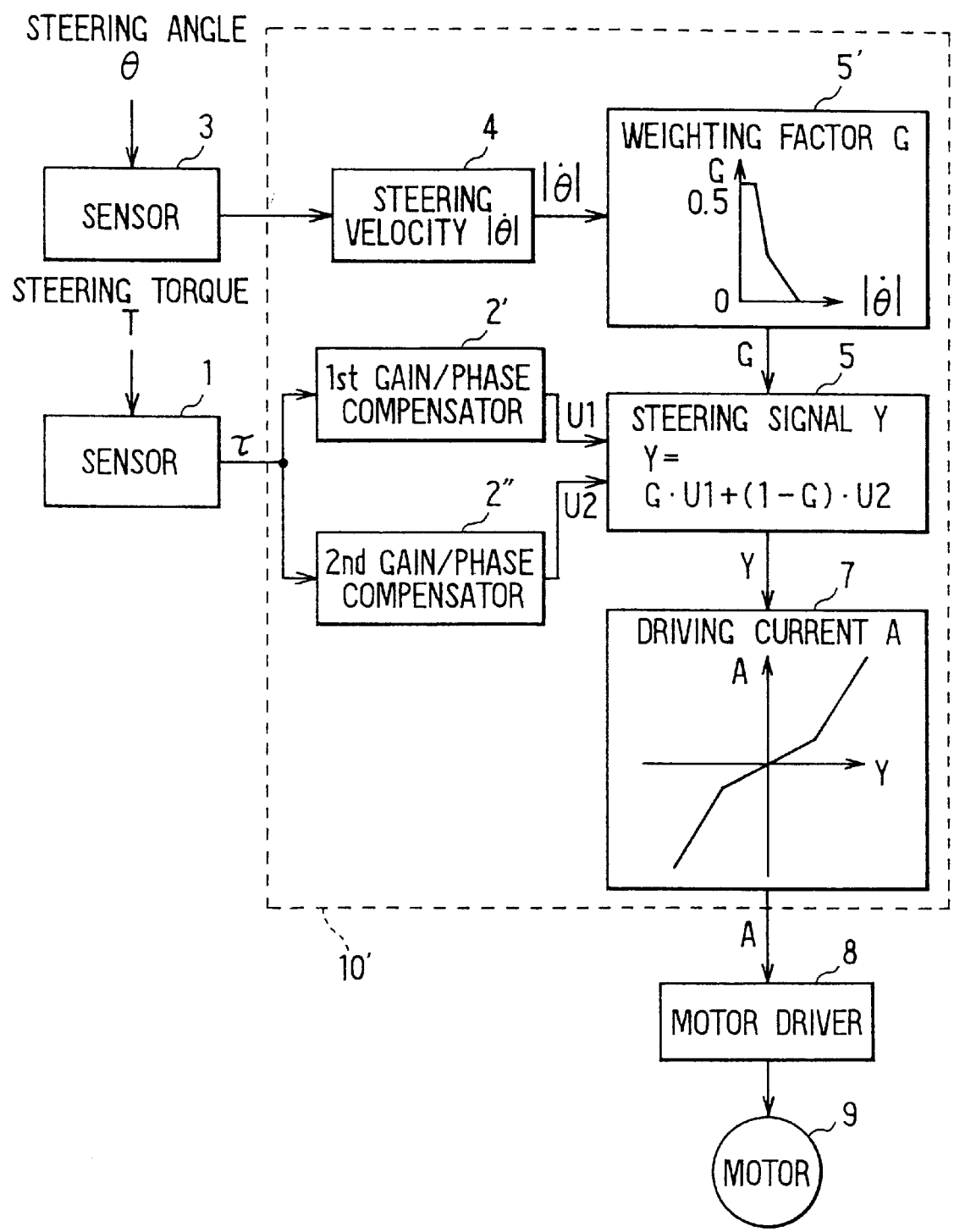
FIG. 5 is a block diagram showing a structure of a power steering device as a second embodiment of the present invention.

The weighted signal generator 6 is a digital circuit which calculates the steering signal Y based on the torque signals U1 and U2 by giving a weight thereto. That is, the steering signal Y is calculated according to the following formula: $Y = G \cdot U1 + (1-G) \cdot U2$. The gain and phase advance in the steering signal Y under an overall transfer characteristic Y(s)/T(s) are shown in FIGS. 4A and 4B for two representative weighting factors, G=0 and 0.5 (G=1 is also shown for reference). The driving current signal generator 7 receives the steering signal Y from the steering signal generator 6 and generates a signal indicating the driving current A based on the steering signal Y. A map shown in FIG. 1 for determining the driving current A according to the steering signal Y is stored in a memory included in the driving current signal generator 7. The power-assist motor 9 is driven by the driving current A determined according to the steering signal Y.

Since the steering signal Y is a signal weighted by the factor G as described above, the torque signal U1 is predominant in determining Y during the fixed steering and the slow steering (when the steering velocity |dθ/dt| low). As a result, the trembling vibrations on the steering wheel are suppressed, though the power assisting response in the steering system is relatively slow. As the steering velocity |dθ/dt| increases, the modified torque signal U2 gradually becomes predominant in place of U1 in determining the steering signal Y. The compensated torque signal U2 solely determines the steering signal Y at the steep steering where the steering velocity |dθ/dt| exceeds a predetermined level. As a result, the power assisting response in the steering system becomes sharp and quick at the steep steering, though some trembling vibrations appear on the steering wheel. The trembling vibrations appearing at the steep steering, however, are not detrimental to steer-feeling because such vibrations are hardly felt by a driver at the steep steering.

In summary, the power steering device as the first embodiment of the present invention operates in the following manner. The steering velocity |dθ/dt| is calculated based on the steering angle θ, while the steering torque signal U1 and the compensated steering torque signal U2 are calculated based on the steering torque T. The steering signal Y is generated by combining U1 and U2 using the weighting factor G determined according to the steering velocity |dθ/dt|. The power-assist motor is driven by the driving current A determined according to the steering signal Y. Since U1 is predominant in the low steering velocity range and U2 having a high gain and an advanced phase is determinant in the high steering velocity range, the trembling vibrations do not appear in the fixed or slow steering and the power assisting response is high in the steep steering. In other words, the power-assist is quickly and sufficiently given in the steep steering, while the trembling vibrations do not appear in the fixed or slow steering. In addition, since the power assisting response gradually and continuously varies according to the steering velocity, no abrupt change is felt by a driver in a whole range of the steering velocity.

Main components (the steering velocity detector 4, the weighting factor generator 5, the gain/phase compensator 2, the weighted signal generator 6 and the driving current signal generator 7) for controlling the power steering device are all included in a digital microcomputer 10 encircled by a dotted line in FIG. 1. Accordingly, all the operations and calculations for signals such as |dθ/dt|, G, U2, Y and A are performed quickly and precisely according to a program and memories contained in the microcomputer 10. Also, with respect to a cost of the device, the microcomputer is more advantageous than analog circuits because the microcomputer is becoming more and more inexpensive recently.

Second Embodiment

A second embodiment of the present invention will be described with reference to FIGS. 5–8B. In this embodiment, the gain/phase compensator 2 of the first embodiment is replaced with two compensators, a first gain/phase compensator 2' and a second gain/phase compensator 2", and the weighting factor generator 5 of the first embodiment is replaced with a weighting factor generator 5'. Other structures and operations are the same as those of the first embodiment.

Figure 6A:
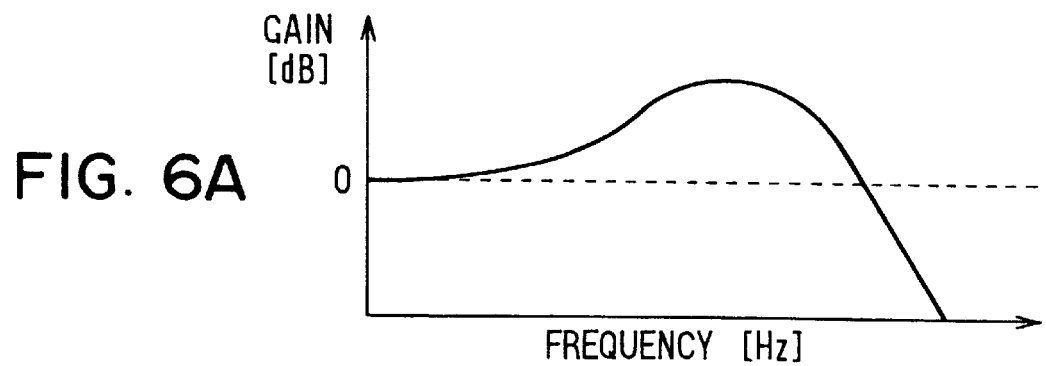
FIGS. 6A and 6B are Bode diagrams showing frequency-response characteristics of a first gain/phase compensator used in the second embodiment.
Figure 6B:
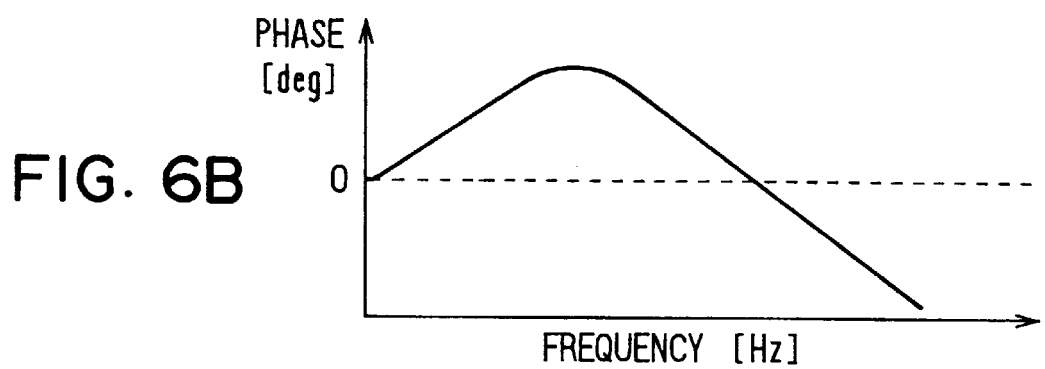
Figure 7A:
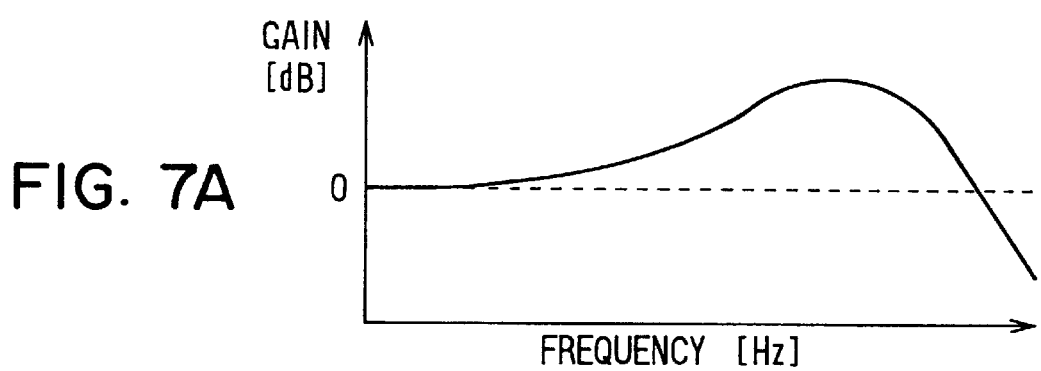
FIGS. 7A and 7B are Bode diagrams showing frequency-response characteristics of a second gain/phase compensator used in the second embodiment.
Figure 7B:
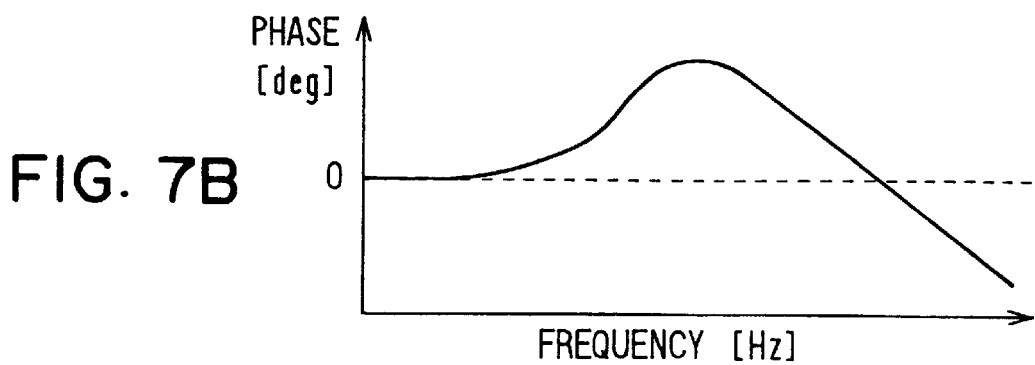

A transfer characteristic U1(s)/τ(s) of the first gain/phase compensator 2" is shown in FIGS. 6A and 6B, in which the gain and the phase advance are enhanced in a relatively low frequency region. A transfer characteristic U2(s)/τ(s) of the second gain/phase compensator 2" is shown in FIGS. 7A and 7B, in which the gain and the phase advance are enhanced in a relatively high frequency region. In other words, the first compensator 2' modifies the torque signal τ into U1 so that the gain is enhanced and the phase is advanced when the torque signal frequency is starting to increase (for example, when the steering velocity is in a transient state from the slow steering to the intermediate steering). On the other hand, the second compensator 2" modifies the torque signal τ into U2 so that the gain is enhanced and the phase is advanced when the torque signal frequency is sufficiently high where the steering is in the steep steering state.

The weighting factor generator 5' of the second embodiment is designed so that the factor G is 0.5 during the fixed steering and the slow steering and gradually decreases toward 0 (zero). When the steering velocity reaches the steep steering state, the factor G becomes 0 (zero). The steering signal Y is generated by combining U1 and U2 using the weighting factor G in the same manner as in the first embodiment.

Figure 8A:
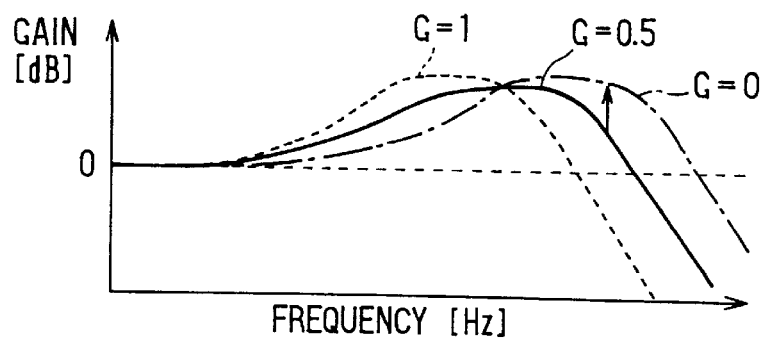
FIGS. 8A and 8B are Bode diagrams showing frequency-response characteristics of a steering signal generator used in the second embodiment.
Figure 8B:
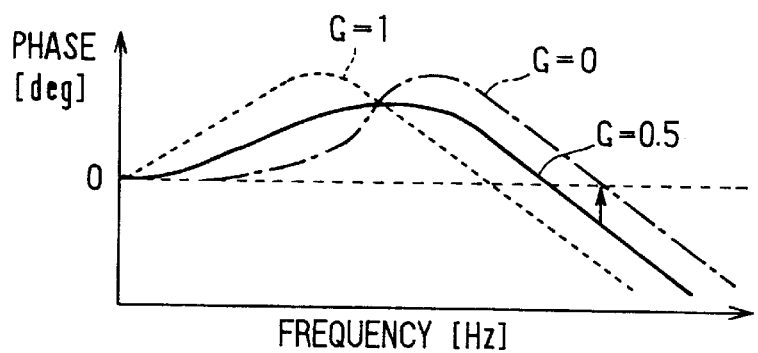

An overall transfer characteristic Y(s)/τ(s) is shown in FIGS. 8A and 8B for respective weighting factors G=0.5 and 0 (G=1 is shown as a reference). As shown in FIGS. 8A and 8B, the gain is enhanced and the phase is advanced in a relatively wide range of the frequency when the weighting factor G is 0.5 (shown by solid lines). This means that the power-assist response is improved to a certain extent even at the slow steering and is smoothly changed to a quick response when the steering comes to the steep steering state. When the weighting factor G is 0 (when the steering velocity |dθ/dt| is in the range of the steep steering), the transfer characteristic of the steering signal Y shows a high gain and a high phase advance in a relatively high frequency range as shown by chained lines in FIGS. 8A and 8B. Since the torque signal frequency is usually high at the steep steering state, a quick power-assist response can be obtained at the steep steering. Though the trembling vibrations appear at the steep steering state in the same manner as in the first embodiment, such trembling vibrations are hardly felt by a driver. Since the weighting factor G gradually decreases from 0.5 to 0 in the intermediate steering velocity range between the slow steering and the steep steering, no abrupt change in the steering system is felt by a driver throughout a whole range of the steering velocity.

A digital microcomputer 10' is used in the second embodiment, too. The digital microcomputer 10' includes the steering velocity detector 4; the steering signal generator consisting of the first gain/phase compensator 2', the second gain/phase compensator 2", the weighting factor generator 5' and the weighted signal generator 6; and the driving current signal generator 7. Accordingly, all the calculating operations are performed quickly and precisely, and the control system can be made at a low cost.

In summary, the second embodiment has an advantage that the power-assist response is improved even at the slow steering state, in addition to the advantages of the first embodiment.

Third Embodiment

A power steering device as a third embodiment of the present invention is designed to further improve the steer-feeling of the first embodiment when the steering wheel is moved quickly and slightly at the vicinity of its neutral position. This kind of steering is usually required to precisely keep a driving lane when a vehicle is driven on a straight express way at a high speed (this steering condition will be referred to as a neutral position steering hereinafter).

Figure 9:
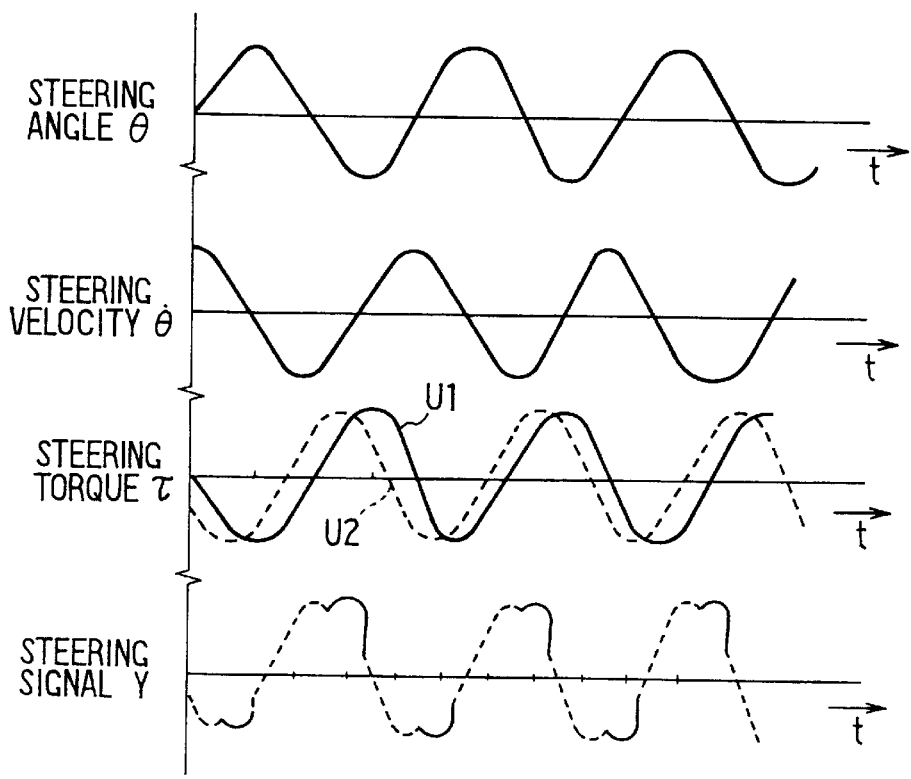
FIG. 9 shows graphs for explaining possible discontinuity of steering signals.

FIG. 9 shows various control signals appearing in this situation in the first embodiment. The top graph shows the steering angle θ which deviates to a plus or minus side from a neutral position of the steering wheel. The second graph shows the steering velocity |dθ/dt| obtained by differentiating the steering angle θ. The third graph shows the torque signal U1 and the compensated torque signal U2. The bottom graph shows the steering signal Y obtained by combining U1 and U2 using the weighting factor G. In the neutral position steering, the steering velocity $|d\theta/dt|$ varies widely and quickly even though the change of the steering angle $\theta$ is small. Therefore, the weighting factor G is frequently switched from its maximum 0.8 to its minimum 0, or vice versa. Accordingly, the predominant components in the steering signal Y are frequently switched between U1 and U2. As a result, the steering signal Y changes discontinuously, as shown in the bottom graph in FIG. 9, every time the steering wheel is operated back and forth in the vicinity of its neutral position. This is detrimental to the steer-feeling.

Figure 10:
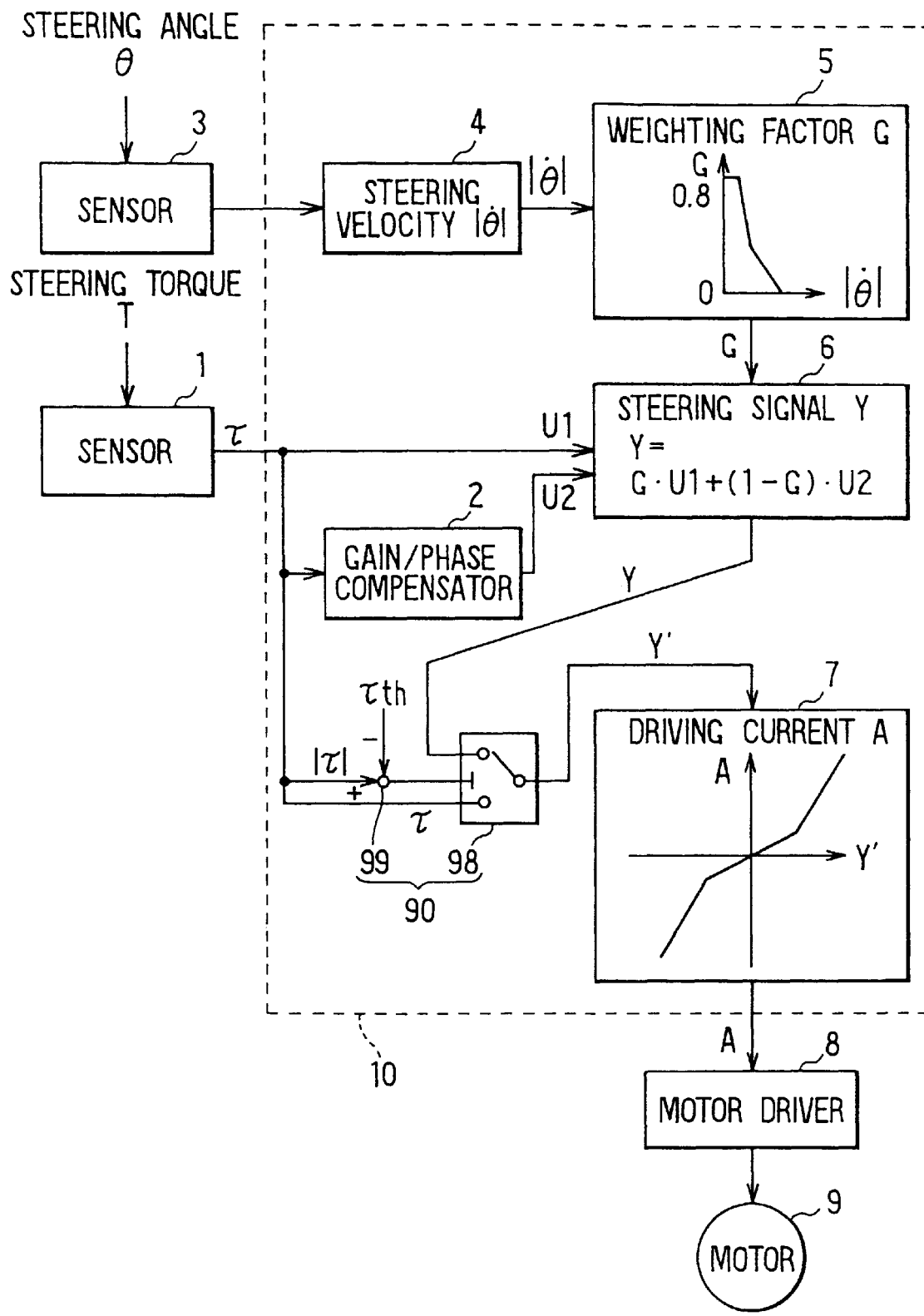
FIG. 10 is a block diagram showing a structure of a power steering device as a third embodiment of the present invention.

The structure of the third embodiment is shown in FIG. 10. In the third embodiment, a bypass circuit 90 for switching the steering signal Y [=G·U1+(1−G)·U2] to U1 when the steering torque signal $\tau$ is lower than a threshold value ith is added to the first embodiment shown in FIG. 1. Other structures and operations are the same as those of the first embodiment. The bypass circuit 90 is composed of a comparator 99 which compares $\tau$ (an absolute value of the steering signal $\tau$) with the threshold value $\tau$th and a switch 98 which switches the steering signal Y to Y' (=U1).

When it is determined by the comparator 99 that $|\tau|$ is smaller than the threshold value $\tau$th, the switch 98 switches the steering signal Y to Y' (=U1=$\tau$). When $|\tau|$ is equal to or larger than $\tau$th, the original steering signal Y is used as a signal for determining the driving current A in the same manner as in the first embodiment. Since the absolute value of the steering torque $|\tau|$ is small in the neutral position steering, Y' (=U1) is used as the steering signal for determining the driving current A. Therefore, the discontinuity of the steering signal in the neutral position steering is avoided, and thereby the steer-feeling is improved. Other advantages obtained in the first embodiment remain unchanged in the second embodiment.

The same bypass circuit 90 may be added to the second embodiment. The steer-feeling in the neutral position steering will be similarly improved in the second embodiment, too.

Fourth Embodiment

Figure 11:
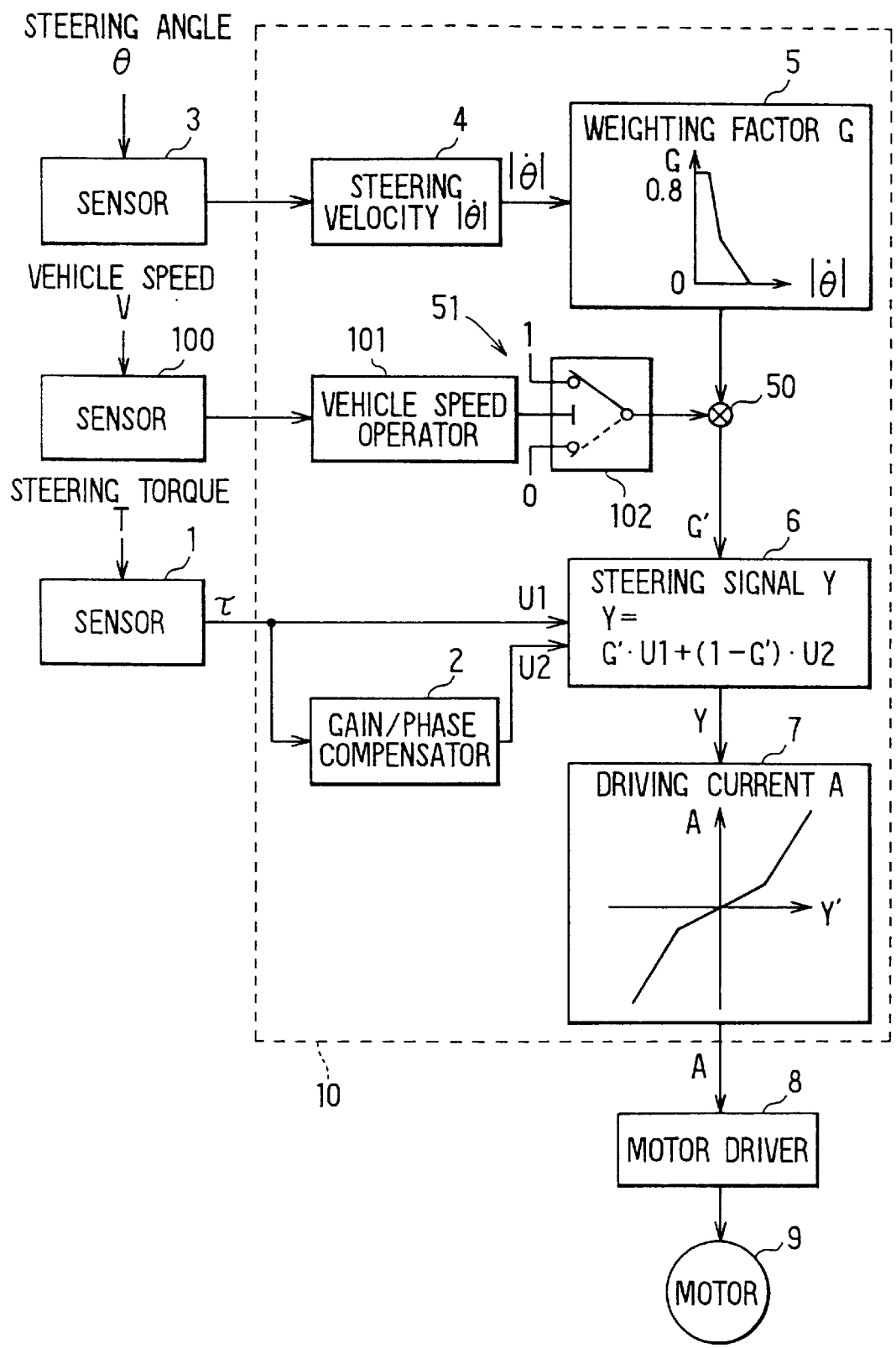
FIG. 11 is a block diagram showing a structure of a power steering device as a fourth embodiment of the present invention.

A structure of a power steering device as a fourth embodiment of the present invention is shown in FIG. 11. In this embodiment, a vehicle speed sensor 100, a vehicle speed signal generator 51 consisting of a vehicle speed operator 101 and a switch 102, and a multiplier 50 are added to the first embodiment shown in FIG. 1. Other structures and operations are the same as those of the first embodiment. These additional components are connected in the control system as shown in FIG. 11. The vehicle speed signal generator 51 outputs signal "1" or "0" according to vehicle speed sensed by the vehicle speed sensor 100. The multiplier 50 multiplies the weighting factor G with 1 or 0 according to the outputs from the vehicle speed signal generator 51, generating a new weighting factor G'. The new weighting factor G' is used in generating the steering signal Y in the same manner as in the first embodiment. The vehicle speed signal generator 51 and the multiplier 50 are digital operators and included in a program of the microcomputer 10 without using additional hard wares.

Any vehicle speed sensor mounted on a vehicle, such as a speed sensor for an anti-lock braking system or a usual speed sensor for a speedometer can be used as the vehicle speed sensor 100. The vehicle speed signal generator 51 outputs a signal 1 when the vehicle is completely stopped or moving very slowly (this condition will be referred to as a substantial halt). On the other hand, the vehicle speed signal generator 51 outputs a signal 0 when the vehicle is not in the substantial halt (when the vehicle is driven). The weighting factor G is converted into a new weighting factor G' by being multiplied with 1 or 0. As a result, when the vehicle is in the substantial halt, the steering signal Y is the same as that of the first embodiment. That is, Y=G·U1+(1−G)·U2, because G=G' in this situation. On the other hand, when the vehicle is not in the substantial halt, the steering signal Y is solely determined by U2. That is, Y=U2, because G'=0 in this situation.

When the vehicle is in the substantial halt, the steep steering is properly and quickly power-assisted, because the compensated component U2 is determinant in the steering signal Y, while the trembling vibrations are suppressed in the slow steering, because the component U1 is predominant in this situation. On the other hand, when the vehicle is not in the substantial halt, the steering signal Y is solely determined by the compensated torque signal U2. Accordingly, the steep steering is properly and quickly power-assisted with some trembling vibrations associated. However, such trembling vibrations are not detrimental to the steer-feeling because they are hardly felt by a driver when the vehicle is driven. Since the weighting factor G is fixed at 0 (zero) in this embodiment as long as the vehicle is driven (not in the substantial halt), the steering signal Y is highly continuous throughout a whole range of the steering velocity.

Fifth Embodiment

Figure 12:
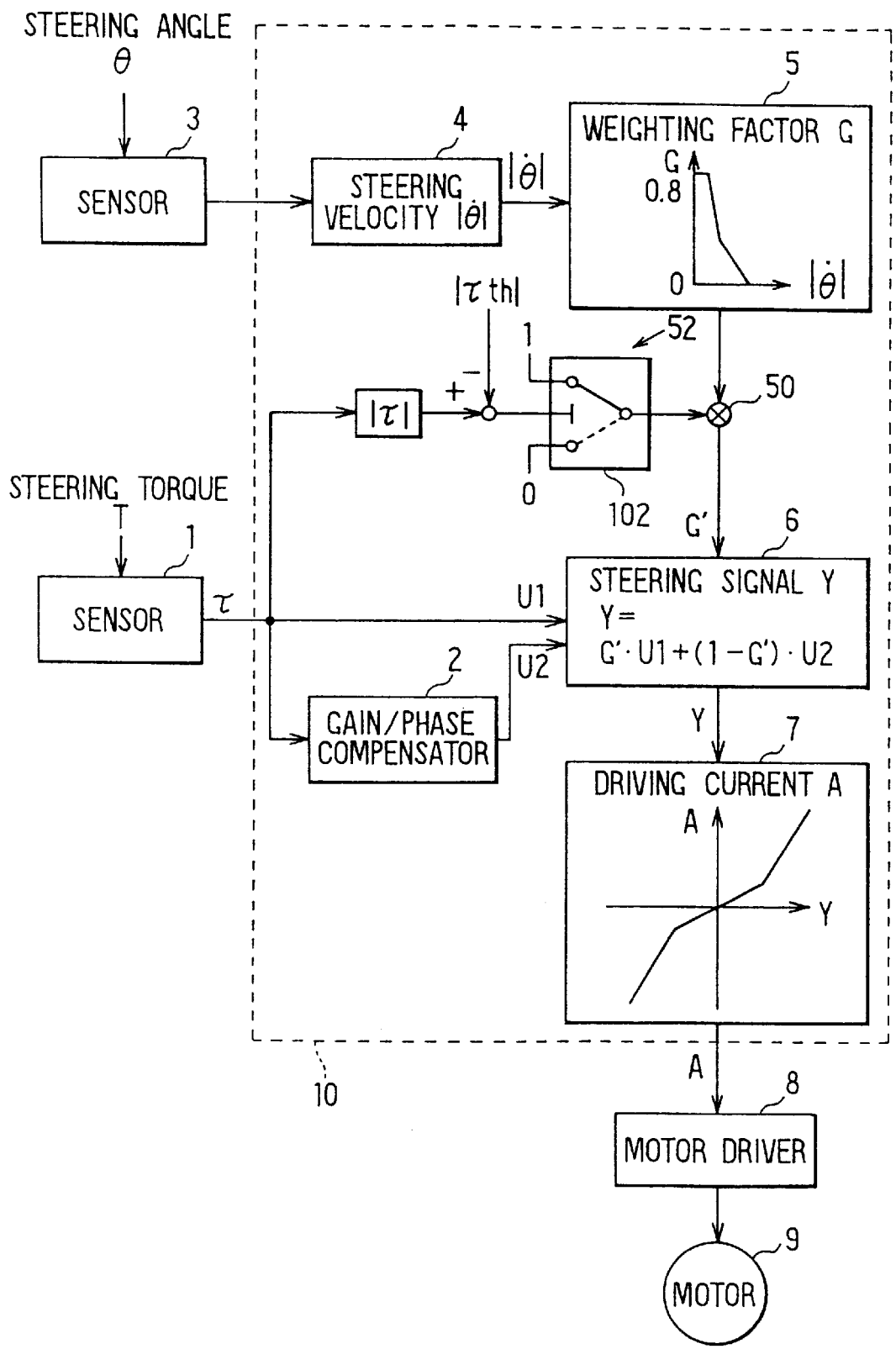
FIG. 12 is a block diagram showing a structure of a power steering device as a fifth embodiment of the present invention.

A block diagram of a fifth embodiment is shown in FIG. 12. This embodiment is the same as the fourth embodiment, except that the vehicle speed signal generator 51 of the fourth embodiment is replaced with a steering torque signal comparator 52.

The steering torque signal comparator 52 having a switch 102 compares the absolute value of the steering torque signal $|\tau|$ with a predetermined threshold value $\tau$th. If $|\tau|$ is equal to or larger than $\tau$th, it is determined that the vehicle is in the substantial halt, because a higher steering torque is required in the substantial halt than in the driving state. On the other hand, if $|\tau|$ is smaller than $\tau$th, it is determined that the vehicle is being driven. The steering torque signal comparator 52 outputs, by switching operation of switch 102, a signal 1 when the vehicle is in the substantial halt and a signal 0 when the vehicle is not in the substantial halt. Hereafter, the control process of the steering system is performed in the same manner as in the fourth embodiment. That is, the weighting factor G is multiplied with the signal 1 or 0 by the multiplier 50 and is fed to the weighted signal generator 6.

Performance and advantages of the fifth embodiment are similar to those of the fourth embodiment. However, since no input interface for receiving vehicle speed signals is necessary in the fifth embodiment, the control system can be simplified. The steering torque signal comparator 52 is included in the program of the microcomputer 10.

Though an electric motor is used in assisting steering in the foregoing embodiments, other electric actuators or hydraulic motors may be used in place of the electric motor.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A power steering device comprising:
   a steering velocity detector which calculates a steering velocity based on a steering angle;
   a steering torque sensor which detects a torsional torque of a steering shaft and generates a steering torque signal;
   a steering signal generating means connected to the steering velocity detector and the steering torque sensor, the steering signal generating means generating a steering signal Y based on the steering torque signal, using a transfer function having a low gain and a low phase advance when the steering velocity is low, the transfer function being modified so that its gain and phase advance gradually become higher in accordance with increase of the steering velocity; and
   a power-assist motor for assisting steering of a vehicle based on the steering signal generated by the steering signal generating means.

2. The power steering device as in claim 1, wherein the steering signal generating means includes:
   a compensator having a transfer function, a gain and a phase advance of which become high in a predetermined frequency region thereof, the compensator formulating a compensated steering torque signal U2 based on the steering torque signal U1, using the transfer function;
   a weighting factor generator for generating a weighting factor G which is high at a low steering velocity, and gradually decreases in accordance with increase of the steering velocity; and
   a weighted signal generator for formulating the steering signal Y which is determined by the following formula:

Y=G·U1+(1−G)·U2.

3. The power steering device as in claim 1, wherein the steering signal generating means includes:
   a first compensator having a first transfer function, a gain and a phase advance of which are high in a relatively low frequency region thereof, the first compensator formulating a first compensated steering torque signal U1 based on the steering torque signal, using the first transfer function;
   a second compensator having a second transfer function, a gain and a phase advance of which are high in a relatively high frequency region thereof, the second compensator formulating a second compensated steering torque signal U2 based on the steering torque signal, using the second transfer function;
   a weighting factor generator for generating a weighting factor G which is high at a low steering velocity, and gradually decreases in accordance with increase of the steering velocity; and
   a weighted signal generator for formulating the steering signal Y which is determined by the following formula:

Y=G·U1+(1−G)·U2.

4. The power steering device as in claim 2, the device further comprising a vehicle speed sensor, wherein:
   the weighting factor G is compulsorily brought to zero when the vehicle speed sensor detects that the vehicle is being driven.

5. The power steering device as in claim 2, wherein:
   the steering signal Y is replaced with the steering torque signal U1 when an absolute value of the steering torque signal is smaller than a predetermined threshold value.

6. The power steering device as in claim 1, the device including a digital microcomputer, wherein:
   the steering signal generating means is formed in the digital microcomputer.

7. The power steering device as in claim 2, wherein:
   the weighting factor G is compulsorily brought to zero when an absolute value of the steering torque signal is smaller than a predetermined threshold value.

8. A method of controlling a power steering device, the method comprising steps of:
   detecting a steering velocity based on a steering angle;
   sensing a steering torque from a torsional torque of a steering shaft;
   generating a steering signal based on the steering velocity and the steering torque, the steering signal being formulated so that it has a higher gain and a higher phase advance in a steep steering state than in a slow steering state; and
   driving a power-assist motor with a power determined by the steering signal.

9. The method of controlling a power steering device as in claim 8, wherein:
   the steep steering state is determined as such when the steering velocity exceeds a predetermined threshold level, and the slow steering state is determined as such when the steering velocity does not reach the predetermined threshold level or the steering angle is at a fixed position.

10. The method of controlling a power steering device as in claim 8, wherein:
    the steering signal gradually varies from a signal corresponding to the steep steering state to a signal corresponding to the slow steering state according to the steering velocity.

* * * * *